US000002002B1

(19) United States

(12) Statutory Invention Registration (10) Reg. No.: US H2002 H

McLachlan et al. (43) Published: Nov. 6, 2001

(54) APPARATUS FOR CONDUCTING RAMAN SPECTROSCOPY USING FIBER OPTICS

(75) Inventors: Richard D. McLachlan, Lupton; Mary Anne Leugers, Midland, both of MI (US)

(73) Assignee: The Dow Chemical Company, Midland, MI (US)

(21) Appl. No.: 08/800,366

(22) Filed: Feb. 14, 1997

Related U.S. Application Data

(63) Continuation of application No. 08/574,887, filed on Dec. 19, 1995, now abandoned.

(51) Int. Cl.[7] ..... G01J 3/44

(52) U.S. Cl. ..... 356/301

(58) Field of Search ..... 356/301, 332; 385/12, 13; 200/227.2, 227.11, 227.14, 227.15, 227.18, 227.23

(56) References Cited

U.S. PATENT DOCUMENTS

| | | | | |
|---|---|---|---|---|
| 4,573,761 | | 3/1986 | McLachlan et al. . | |
| 4,637,716 | * | 1/1987 | Auweter et al. | 356/337 X |
| 4,823,166 | | 4/1989 | Hartog et al. . | |
| 4,919,533 | | 4/1990 | Bowley et al. . | |
| 5,112,127 | | 5/1992 | Carrabba et al. | 356/301 |
| 5,194,913 | * | 3/1993 | Myrick et al. | 356/301 |
| 5,217,306 | | 6/1993 | Wada . | |
| 5,377,004 | | 12/1994 | Owen et al. | 356/301 |
| 5,450,193 | * | 9/1995 | Carlsen et al. | 306/301 |
| 5,521,703 | * | 5/1996 | Mitchell | 356/301 |

OTHER PUBLICATIONS

Bellow, J. M., et al., Surface–Enhanced Raman Scattering Fiber–Optic Sensor, *Applied Spectroscopy*, vol. 44, No. 1, (1990), p. 63–69.

* cited by examiner

*Primary Examiner*—Daniel T. Pihulic

(74) *Attorney, Agent, or Firm*—Timothy S. Stevens; Stephen S. Grace

(57) ABSTRACT

A fiber optic probe apparatus useful for conducting Raman spectroscopy remotely over optical fibers with minimal interference from Raman scattering within said fibers which includes three elements. The first element is at least one transmitting optical fiber having a first end and a second end. The second element is at least one collecting optical fiber for collecting light from a sample positioned near the first end of the transmitting optical fiber, the collecting optical fiber having a first end and a second end, the first end of the collecting optical fiber being in closely spaced relationship with the first end of the transmitting optical fiber wherein the longitudinal axis of the first end of the collecting optical fiber converges with the longitudinal axis of the first end of the transmitting optical fiber at an angle of less than forty five degrees. The third element is at the heart of the invention. The third element is a rejection optical filter in optical communication with the second end of the collecting optical fiber.

4 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

APPARATUS FOR CONDUCTING RAMAN SPECTROSCOPY USING FIBER OPTICS

CROSS-REFERENCE TO RELATED APPLICATION

This is a continuation of application Ser. No. 08/574,887, filed Dec. 19, 1995 now abandoned.

BACKGROUND

This invention relates to an apparatus for conducting Raman spectroscopy.

A Raman spectrum generally corresponds to frequencies of molecular vibrations and therefore can be related directly to molecular structure. In Raman spectroscopy, monochromatic light (excitation light) is generally directed onto a sample. Typically, this monochromatic light is a single laser line. Most of the light scattered off the sample will be at the same wavelength as this laser line (Rayleigh scattering), but a portion of the light scattered off the sample will be scattered at wavelengths containing the sum or difference of the excitation and molecular vibrational frequencies (Raman scattering).

Optical fibers have been advantageous in Raman spectroscopy. When optical fibers are used, light from a laser can be delivered to a sample over one fiber. After passage through the sample, the light scattered from the sample is collected by one or more other fibers and directed into a wavelength selective light detector, i.e., a spectrometer. The advantages of using optical fibers in Raman spectroscopy include sampling remotely from the spectrometer, sampling in a hostile environment and connecting several sampling systems to a single detector. The primary disadvantage of using optical fibers is that Raman spectra may be generated from the optical fiber material itself, interfering with the Raman spectra of the sample. For example, if a silica-core fiber is used, the transmitted light will generate Raman spectra from the silica in the fiber. Part of this silica based Raman spectra, along with part of the transmitted light, may be scattered by the sample and enter the collecting optical fiber. The collected excitation light will generate additional silica Raman light as it traverses the collecting optical fiber. This silica based Raman spectra will be directed back to the spectrometer along with the sample Raman spectra, thereby interfering with the analysis.

The fiber optic probe for Raman analysis of U.S. Pat. No. 4,573,761 issued to McLachlan, Jewett and Evans on Mar. 4, 1986 was a substantial advance in the art of Raman spectroscopy using fiber optic probes. The probe of the '761 Patent allowed excitation light scattered from the sample to be directed back to the detector by way of a silica based optical fiber. However, this light generated interfering silica Raman spectra convolved with the sample Raman spectra. This interference is most serious when the sample is a turbid liquid, a solid, or solid particles, because such samples tend to scatter substantial amounts of light.

The fiber optic probe for Raman analysis of U.S. Pat. No. 5,112,127 issued to Carrabba and Rauh on May 12, 1992 was a further advance in the art of Raman spectroscopy using fiber optic probes because a filter (element 44 of FIG. 1 of the '127 Patent) was positioned in the path of the Raman spectra before it enters the optical fiber connected to the spectrometer. The filter was an edge filter or a notch filter which blocked the laser wavelength but passed the Raman spectra and therefore eliminated the possibility of interfering silica Raman spectra on top of the sample Raman spectra. However, the probe of the '127 Patent exposed the filter to hostile sample conditions such as heat, which can deteriorate such filters.

It would be a further advance in the art of Raman spectroscopy fiber optic probes if the filter could be protected from such hostile sample conditions without introducing interfering Raman spectra.

SUMMARY OF THE INVENTION

A primary benefit of the instant invention is a solution, to a large degree, to the above mentioned problem. In the instant invention an optical filter is positioned after a light collecting optical fiber. Surprisingly, this arrangement does not result in substantial interfering Raman spectra from the silica in the collecting optical fiber when the Raman probe of U.S. Pat. No. 4,573,761 is used.

The instant invention is a fiber optic probe apparatus useful for conducting Raman spectroscopy remotely over optical fibers with minimal interference from Raman scattering within said fibers. The invention comprises three elements. The first element is at least one transmitting optical fiber having a first end and a second end. The second element is at least one collecting optical fiber for collecting light from a sample positioned near the first end of the transmitting optical fiber, the collecting optical fiber having a first end and a second end, the first end of the collecting optical fiber being in closely spaced relationship with the first end of the transmitting optical fiber wherein the longitudinal axis of the first end of the collecting optical fiber converges with the longitudinal axis of the first end of the transmitting optical fiber at an angle of less than forty five degrees. The third element is a rejection optical filter in optical communication with the second end of the collecting optical fiber. Alternatively, the third element is a bandpass optical filter, the bandpass optical filter being in optical communication with the second end of the transmitting optical filter. Preferably, both a rejection optical filter and a bandpass optical filter are used.

DETAILED DESCRIPTION OF THE INVENTION

Figure 1:
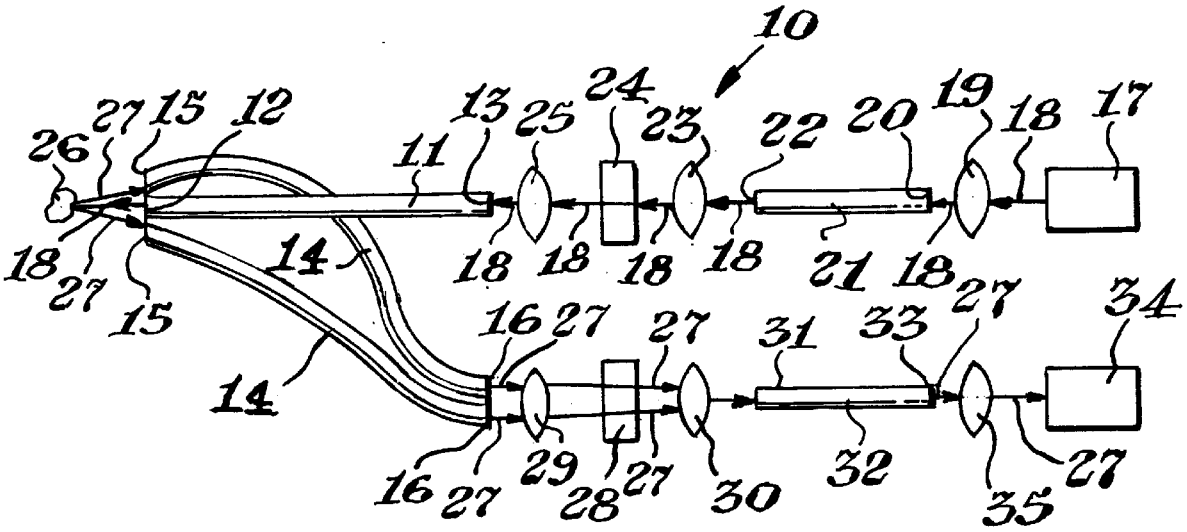
FIG. 1 is a schematic drawing of an embodiment of the instant invention showing a rejection optical filter 28 mounted after the collection optical fibers 14.

Referring now to FIG. 1, therein is shown a fiber optic probe apparatus 10 of this invention including a transmitting optical fiber 11. The transmitting optical fiber 11 has a first end 12 and a second end 13. The apparatus 10 also includes two collecting optical fibers 14. The collecting optical fibers 14 each have a first end 15 and a second end 16. The first ends 15 of the collecting optical fibers 14 are in closely spaced relationship with the first end 12 of the transmitting optical fiber 11. In addition, the longitudinal axis of the first end 12 of the transmitting optical fiber 11 converges with the longitudinal axes of the first ends 15 of the collecting optical fibers 14 at an angle of convergence which is less than forty five degrees.

A laser 17 is used to generate a beam of essentially monochromatic light 18 which is focused by first lens 19 into the first end 20 of a sending optical fiber 21. The beam of light 18 emerges from a second end 22 of the sending optical fiber 21 and is focused by a second lens 23 through a bandpass optical filter 24 and third lens 25 into the second end 13 of the transmitting optical fiber 11. The beam of light 18 then emerges from the first end 12 of the transmitting optical fiber 11 to illuminate a sample particle 26.

It should be understood that the particle 26 is not an element of the instant invention. Thus, the instant invention can be used to analyze samples that are transparent, translucent or opaque. However, the instant invention has important benefits when used to analyze particulate samples.

Scattered light 27 from particle 26 is collected into the first ends 15 of the collecting optical fibers 14 and emerges from the second ends 16 of the collecting optical fibers 14 and is focused through a rejection optical filter 28 by fourth lens 29. Fifth lens 30 focuses the light 27 into the first end 31 of a detector optical fiber 32. The light 27 emerges from the second end 33 of the detector optical fiber 32 and is focused into a light detector 34 by sixth lens 35.

Most preferably, the laser 17 generates a perfectly monochromatic beam of light 18. However some lasers generate enough light at other wavelengths to interfere with sensitive Raman analysis. The light emerging from the sending optical fiber thus contains the primary laser wavelength, other wavelengths generated by the laser, and wavelengths generated by Raman scatter or fluorescence within the fiber. The bandpass optical filter 24 is designed to pass the primary wavelength of the laser 17 and to filter out other wavelengths. Preferably, the bandpass optical filter 24 filters out the Raman scattered light generated in the sending optical fiber 21. The use of a laser as a light source is preferred. However, any source of light suitable for Raman spectroscopy can, of course, be used.

The wavelength of the scattered light 27 is primarily the primary wavelength of the laser 17 but also includes light at nearby wavelengths caused by the Raman effect. The rejection optical filter 28 is selected to filter out the primary wavelength of the laser 17 but to pass the nearby wavelengths caused by the Raman effect. The rejection optical filter 28 thus essentially eliminates interfering Raman emission from silica in the detector optical fiber 32. The rejection optical filter 28 is preferably an edge filter or notch filter selected to filter out the primary wavelength of the laser 17 but pass the Raman emission. Because the quantity of Raman scattered light generated in any homogeneous medium is proportional to the pathlength within that medium of the excitation light, the intensity of the silica Raman spectrum, and thus the degree of interference, is proportional to the length of the optical fibers. For solid or turbid liquid samples, this limits the useful length of optical fibers to a few inches or a few feet, depending on the scattering properties of the sample. Thus, if the silica Raman scatter can be essentially eliminated, as is done by the use of the rejection optical filter 28, Raman spectra of turbid liquid or solid samples can be measured interference-free regardless of the distance from the sample point to the laser and spectrometer.

Surprisingly, the ratio of the intensity of light at the primary wavelength of the laser 17 to the intensity of the Raman wavelengths in the scattered light 27 from the particle 26 does not cause excessive Raman emission interference from the silica in the collecting optical fibers 14. This fact is probably related to the geometry of the first end 12 of the transmitting optical fiber 11 relative to the first ends 15 of the collecting optical fibers 14, i.e., their closely spaced relationship and the convergence of their axes. This relationship appears to minimize collection of specular reflections from the sample particles 26. The length of the collecting optical fibers 14 is preferably as short as practical, e.g., eight to twelve inches, to minimize residual interfering Raman emissions in the collecting optical fibers 14.

Elements 11 and 14 are preferably contained in a fiber optic probe as disclosed in U.S. Pat. No. 4,573,761 which is hereby fully incorporated by reference. Elements 23, 24, and 25 are inserted in the optical path of the transmitting optical fiber 11. Elements 28, 29 and 30 are inserted in the optical paths of the collecting optical fibers 14. All of elements 23, 24, 25, 28, 29 and 30 are preferably located outside of the fiber optic probe in a single module. This is preferably done by terminating the transmitting optical fiber 11 and the collecting optical fiber 14 near, but outside of that end of the probe which is not in contact with the sample 26 and connecting the fibers to a module containing the elements 23, 24, 25, 28, 29 and 30. The module is optically connected to the laser 17 and the spectrometer 34 by a sending optical fiber 21 and one or more detector optical fibers 32 of the appropriate length. The module can be connected directly and rigidly to the probe body or it can be separated from the probe body by a flexible fiber optic cable.

The light detector 34 is preferably a spectrometer as is well known in the art. Elements 21 and 32 are often relatively long fiber optic cables, e.g., ten meters to one hundred meters, that allow the separation of the laser 17 and the detector 34 from the sample particle 26.

EXAMPLE 1

This example will describe a preferred apparatus embodiment according to the instant invention. An apparatus, like the apparatus 10 of FIG. 1, is assembled. The elements 11 and 14 are included in a fiber optic probe built according to the teachings of U.S. Pat. No. 4,573,761. The transmitting optical fiber 11 and the six collecting optical fibers 14 are ten inch long portions of silica core/silica clad/polyamide jacketed optical fibers (part number 320/385/415 from Polymicro Technologies, Phoenix, Ariz.).

The laser 17 is a ten milliwatt helium-neon laser (available from Melles Griot, Irvine, Calif.) operated at 632.8 nanometers. The lens 19 is a twenty five millimeter focal length simple lens (available from Edmund Scientific, Barrington, N.J.). The sending optical fiber 21 is a fifteen meter long silica core/silica clad/polyamide jacketed optical fiber (part number 320/385/415 from Polymicro Technologies, Phoenix, Ariz.). Lenses 23, 25, 29, and 30 as well as filters 24 and 28 are mounted in an aluminum body machined to receive and mount these elements and to provide the needed optical paths.

Second lens 23 and third lens 25 are ten millimeter focal length simple lenses (available from Edmund Scientific, Barrington, N.J.). Fourth lens 29 and fifth lens 30 are ten millimeter achromats (available from Edmund Scientific, Barrington, N. J.). The 1 nanometer bandpass filter 24 has a maximum transmission at 633 nanometers (available from Optical Filter Corporation, Natick, Mass.). The rejection optical filter 28 is a 633 nanometer long pass filter to absorb light at 633 nanometers (available from Optical Filter Corporation, Natick, Mass.).

The sixth lens 35 is a twenty five millimeter focal length achromat (available from Edmund Scientific, Barrington, N.J.). The detection optical fiber 32 is a fifteen meter long bundle of six silica core/silica clad/polyimide jacketed optical fibers (part number 320/385/415 from Polymicro Technologies, Phoenix, Ariz.). The light detector 34 is a spectrograph (available as Model HR 320 from Instruments, SA, Metuchen, N.J.). The spectrograph is fitted with a 600 line per millimeter grating and a three stage Peltier liquid cooled silicon charge coupled device (available as part number PM 512 from Photometrics Inc., Tucson, Ariz.).

EXAMPLE 2

Figure 2:
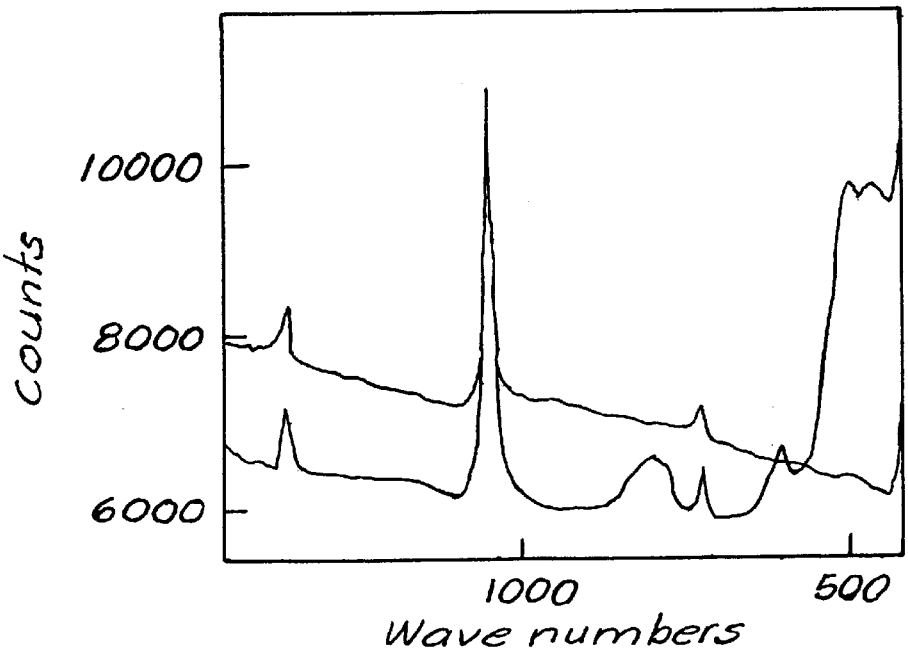
FIG. 2 shows a Raman spectra discussed in Example 2.

This example will describe the operation of the apparatus of Example 1 as well as a comparison to the operation of a modified device. The fiber optic probe of Example 1 is inserted into a sample of sodium nitrate powder. The upper spectra shown in FIG. 2 is produced. The filters 24 and 28 are removed from the device of Example 1 and the lower spectra shown in FIG. 2 is produced. The response of the lower spectra at about 600 and about 800 wavenumbers ($cm^{-1}$) and especially at about 500 wavenumbers is interference from Raman emission from silica in the detector optical fiber 32.

What is claimed is:

1. A fiber optic probe apparatus useful for conducting Raman spectroscopy remotely over optical fibers with minimal interference from Raman scatering within said fibers, comprising:

(a) at least one transmitting optical fiber for transmitting light, the transmitting optical fiber having a first end and a second end;

(b) at least one collecting optical fiber for collecting light from a turbid liquid or solid sample positioned near the first end of the transmitting optical fiber, the collecting optical fiber having a first end and a second end, the first end of the collecting optical fiber being in closely spaced relationship with the first end of the transmitting optical fiber wherein the longitudinal axis of the first end of the collecting optical fiber converges with the longitudinal axis of the first end of the transmitting optical fiber at an angle of less than forty five degrees;

(c) a rejection optical filter adapted to filter out a laser line, the rejection optical fiber in optical communication with the second end of the collecting optical fiber.

2. The apparatus of claim 1, further comprising:

d) a sending optical fiber having a first end and a second end, the second end of the sending optical fiber being in optical communication with the second end of the transmitting optical fiber;

e) a light source for directing light into the first end of the sending optical fiber so that the light can emerge from the first end of the transmitting optical fiber onto a sample particle positioned near the first end of the transmitting optical fiber;

f) a detector optical fiber having a first end and a second end, the first end of the detector optical fiber being in optical communication with the rejection optical filter;

g) a light detector in optical communication with the second end of the detector optical fiber so that light from the sample partical can travel along the collecting optical fiber, be filtered by the rejection optical filter and then be detected by the light detector.

3. The apparatus of claim 1, further comprising:

(d) a bandpass optical filter, the bandpass optical filter being in optical communication with the second end of the transmitting optical fiber.

4. The apparatus of claim 1, further comprising:

(e) a sending optical fiber having a first end and a second end, the second end of the sending optical fiber being in optical communication with the bandpass optical filter and the second end of the transmitting optical fiber, so that light traveling from the sending optical fiber can be filtered by the bandpass filter and directed into the second end of the transmitting optical fiber;

(f) a light source for directing light into the first end of the sending optical fiber so that the light can emerge from the first end of the transmitting optical fiber onto a sample particle positioned near the first end of the transmitting optical fiber;

(g) a detector optical fiber having a first end and a second end, the first end of the detector optical fiber being in optical communication with the rejection optical filter;

(h) a light detector in optical communication with the second end of the detector optical fiber so that light from the sample particle can travel along the collecting optical fiber, be filtered by the rejection optical filter and then be detected by the light detector.

* * * * *